United States Patent [19]

Sampei et al.

[11] Patent Number: 4,512,012

[45] Date of Patent: Apr. 16, 1985

[54] TIME-SWITCH CIRCUIT

[75] Inventors: Takeshi Sampei, Sagamihara; Norio Miyahara, Higashiyamato; Tadanobu Nikaido; Hiroaki Sato, both of Tokyo; Keizo Aoyama, Yamato, all of Japan

[73] Assignee: Fujitsu Limited, Kawasaki, Japan

[21] Appl. No.: 465,604

[22] Filed: Feb. 10, 1983

[30] Foreign Application Priority Data

Feb. 10, 1982 [JP] Japan .................................. 57-20043

[51] Int. Cl.$^3$ ............................................... H04J 3/00
[52] U.S. Cl. ...................................................... 370/66
[58] Field of Search .............................. 370/64, 68, 66

[56] References Cited

U.S. PATENT DOCUMENTS

| 3,956,593 | 5/1976 | Collins et al. | 370/63 |
| 4,009,349 | 2/1977 | Belforte et al. | 370/66 |
| 4,093,827 | 6/1978 | Charransol et al. | 370/66 |
| 4,160,127 | 7/1979 | Slana et al. | 370/16 |
| 4,206,322 | 6/1980 | Lurtz | 370/66 |
| 4,320,501 | 3/1982 | Le Dieu et al. | 370/68 |

FOREIGN PATENT DOCUMENTS 2341999 9/1977 France.
2507372 12/1982 France.

OTHER PUBLICATIONS

Review of Electrical Communication Laboratories, "A Time Division Switching Network Based on Time Switches", Tawara et al., vol. 27, Nos. 9-10, Sep.-Oct. 1979, pp. 758-772.

IEEE International Solid-State Circuits Conference, "A LSI Time Switch for Digital Telephone Switching", Nikaido et al., vol. 25, 2/82, pp. 214-215.

Primary Examiner—Douglas W. Olms
Assistant Examiner—Frank M. Scutch, III
Attorney, Agent, or Firm—Staas & Halsey

[57] ABSTRACT

A time-switch circuit for use in a primary time switch (PTSW), a secondary time switch (STSW), and a space switch (SSW) of a digital time-division switching system is disclosed. The time switch comprises a plurality of memory circuits ($MUC_{11}$ to $MUC_{15}$, $MUC_{21}$ to $MUC_{25}$). Each memory circuit comprises a memory unit (MEM), an address buffer (AB) for a first address, an m-ary counter (T-CTR) for a second address, an address selector (AS) for selecting either the first or second address, an input data buffer (IB), and an output data buffer (OB). In a write cycle, input data from the input data buffer is written into the memory unit by either the first or second address signal, and in a read cycle, output data is read out of the memory unit by either the second or first address. Selection of the first and second addresses is performed by the address selector, which is controlled by an address-selection mode switch circuit ($M_0$). Further, the write enable mode of the memory unit is controlled by a write mode switch circuit ($M_1$).

9 Claims, 15 Drawing Figures

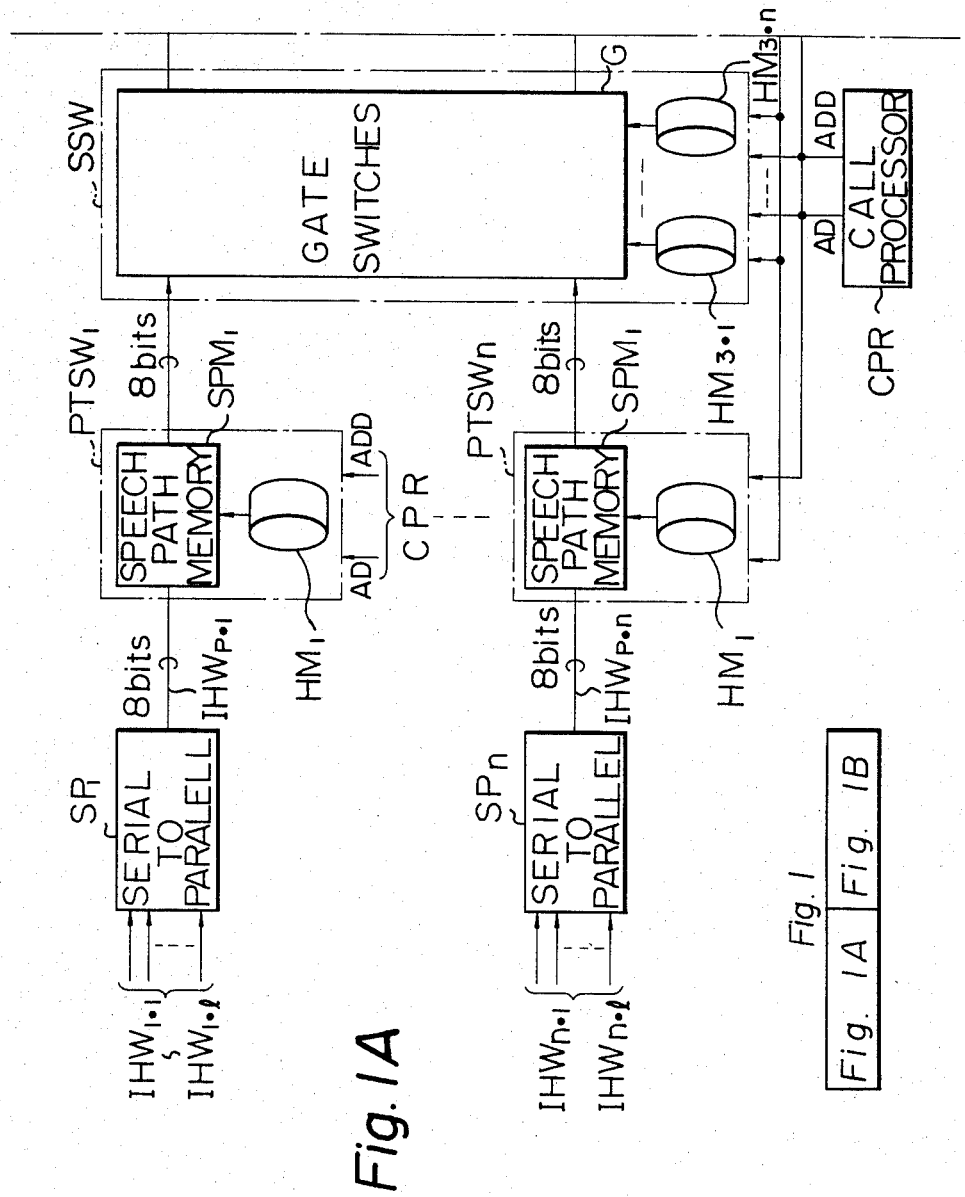

TIME-SWITCH CIRCUIT

BACKGROUND OF THE INVENTION

1. Field of the Invention

The present invention relates to a digital time-division switching system. More particularly, it relates to the improvement of each memory portion of time switches and a space switch of a three-stage (Time-Space-Time) time-division switching system.

2. Description of the Prior Art

A digital time-division switching system broadly uses Time-Space-Time switches, i.e., primary time switches, a space switch, and secondary time switches. Each of the primary time switches comprises a primary speech path memory, a hold memory, and a time slot counter. In this case, speech signals, each carrying 8 parallel bits, are written into the primary speech path memory upon receipt of addresses read out of the hold memory and are read from the primary speech path memory into the space switch upon receipt of addresses generated by the time slot counter. That is, the primary speech path memory adopts a random write operation and a sequential read operation. Similarly, each of the secondary time switches comprises a secondary speech path memory, a hold memory, and a time slot counter. In this case, the speech signals transmitted from the space switch are written into the secondary speech path memory upon receipt of addresses generated by the time slot counter and are read from the secondary speech path upon receipt of addresses read out of the hold memory. That is, the secondary speech path memory adopts a sequential write operation and a random read operation.

On the other hand, the space switch, which is interposed between the primary time switches and the secondary time switches, comprises gate switches for connecting one of the primary time switches to one of the secondary time switches and further comprises hold memories for controlling the gate switches.

In the above-mentioned prior art, however, although circuits such as the speech memories and the hold memories have a similar configuration, each circuit is constructed by combining general-purpose memory unit elements and general-purpose logic integrated circuits, which complicates the design and manufacture of a digital time-division switching system, thereby increasing the cost thereof.

SUMMARY OF THE INVENTION

It is an object of the present invention to provide a digital time-division switching system which is easy to design and manufacture, thereby reducing the cost.

According to the present invention, the speech memories and the hold memories are constructed by arranging connections on only one kind of circuit. This kind of circuit can be constructed easily with a one-chip large-scale integrated (LSI) semiconductor device, thereby enabling the size of each memory to be reduced and, accordingly, enabling the size of the entire system to be reduced.

The present invention will be more clearly understood from the description set forth below, in which the present invention is contrased with the prior art and reference is made to the accompanying drawings, wherein.

BRIEF DESCRIPTION OF THE DRAWINGS

FIGS. 1A and 1B is a block diagram of a general digital time-division switching system;

DESCRIPTION OF THE PREFERRED EMBODIMENTS

Figure 1B:
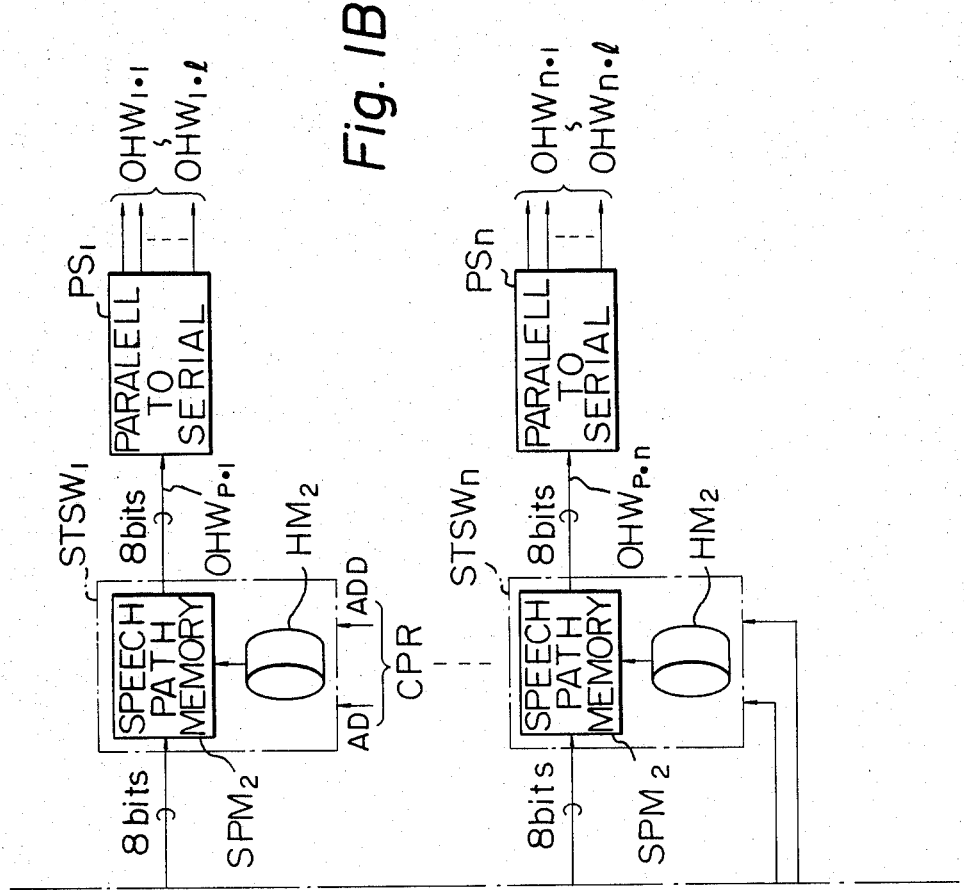

In FIG. 1, which is a general digital time-division switching system, $IHW_{1\text{-}1}$ through $IHW_{1\text{-}l}$, ---, $IHW_{n\text{-}1}$ through $IHW_{n\text{-}l}$ designate input highways, $SP_1$ through $SP_n$ designate serial-to-parallel conversion circuits, $PTSW_1$ through $PTSW_n$ designate primary time switches, SSW designates a space switch, $STSW_1$ through $STSW_n$ designate secondary time switches, $PS_1$ through $PS_n$ designate parallel-to-serial conversion circuits, $OHW_{1\text{-}1}$ through $OHW_{1\text{-}n}$, ---, $OHW_{n\text{-}1}$ through $OHW_{n\text{-}l}$ designate output highways, and CPR designates a call processor for controlling the entire system.

Speech signals, having 8 serial bits per time slot, are transported over the input highways $IHW_{1\text{-}1}$ through $IHW_{1\text{-}n}$. The serial 8-bit signals are converted by the serial-to-parallel conversion circuit $SP_1$ into parallel 8-bit signals. As a result, each speech signal is transported over the eight parallel highways $IHW_{p\text{-}1}$ having one bit per time slot on the output side of the serial-to-parallel conversion circuits $SP_1$. In other words, if the multiplicity of each of the input highways $IHW_{1\text{-}1}$ through $IHW_{1\text{-}n}$ is m/l, the multiplicity of each of the parallel highways $IHW_{p\text{-}1}$ is m.

The speech signals transported over the parallel highways $IHW_{p\text{-}1}$ through $IHW_{p\text{-}n}$ are transmitted to the primary time switches $PTSW_1$ through $PTSW_n$ so that the time slots of the speech signals are changed by the primary time switches $PTSW_1$ through $PTSW_n$. Switching between the highways is performed by the space switch SSW. The speech signals are next transmitted to the secondary time switches $STSW_1$ through $STSW_n$ and are then converted by the parallel-to-serial conversion circuits $PS_1$ through $PS_n$ into serial 8-bit signals per time slot. Thus, a speech signal transported over one of the input highways $IHW_{1\text{-}1}$ through $IHW_{1\text{-}l}$, ---, $IHW_{n\text{-}1}$ through $IHW_{n\text{-}1}$ is transmitted to a predetermined time slot of a predetermined one of the output highways $OHW_{1\text{-}1}$ through $OHW_{1\text{-}l}$, ---, $OHW_{n\text{-}1}$ through $OHW_n$ so as to complete a switching operation. The digital time-division switching system, illustrated in FIG. 1, is called a three-stage Time-Space-Time (TST) configuration, a term which is broadly used.

Figure 2:
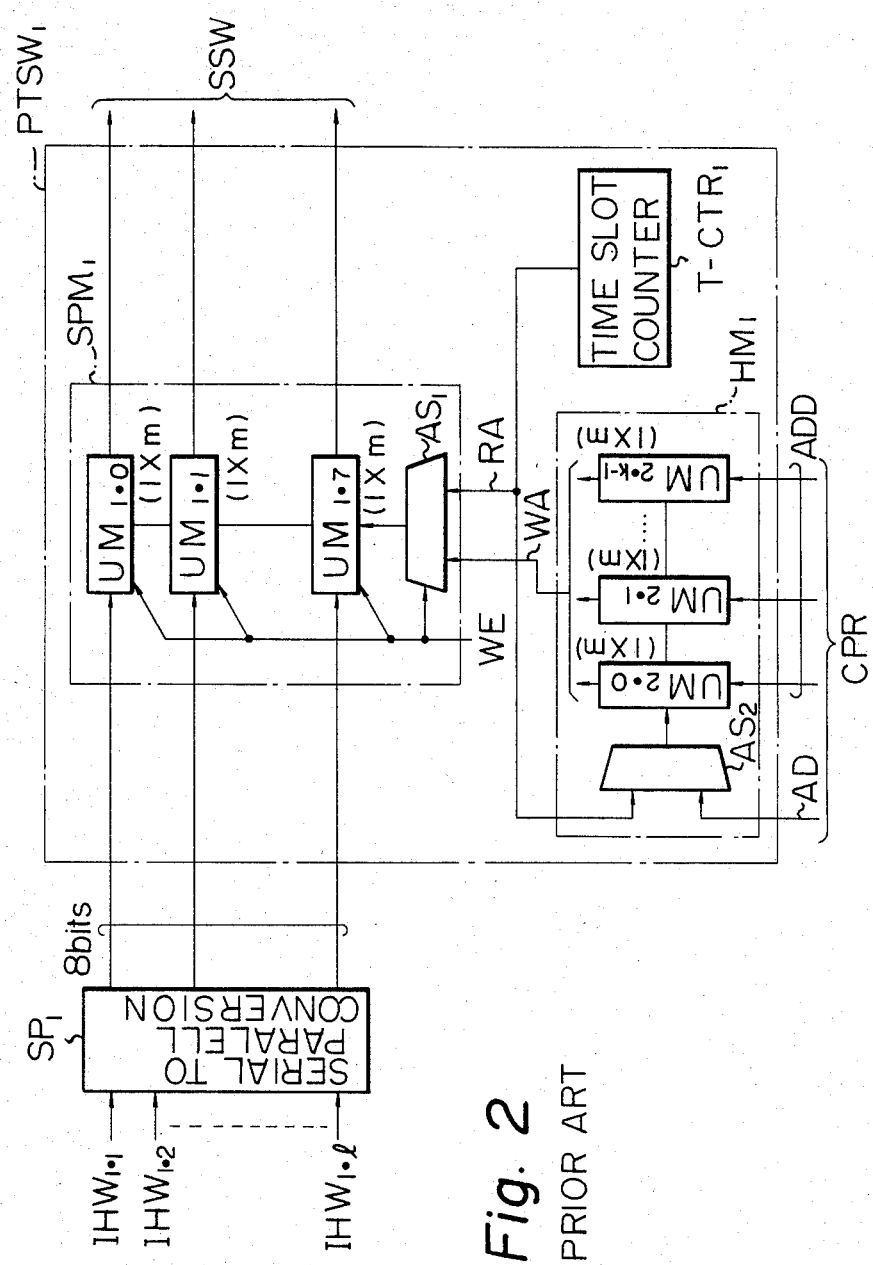
FIG. 2 is a block diagram of a prior art primary time switch.

A primary time switch such as $PTSW_1$ comprises a primary speech path memory $SPM_1$ and a hold memory $HM_1$. A speech signal is written from the serial-to-parallel conversion circuit $SP_1$ into the primary speech path memory $SPM_1$ at every time slot by using an arbitrary address read out of the hold memory $HM_1$, and the written signal is read out upon the receipt of an address generated by a cyclic counter, i.e., a time slot counter, which is not shown in FIG. 1 but is shown in FIG. 2, thereby performing the conversion of a time slot containing a speech signal.

Figure 3:
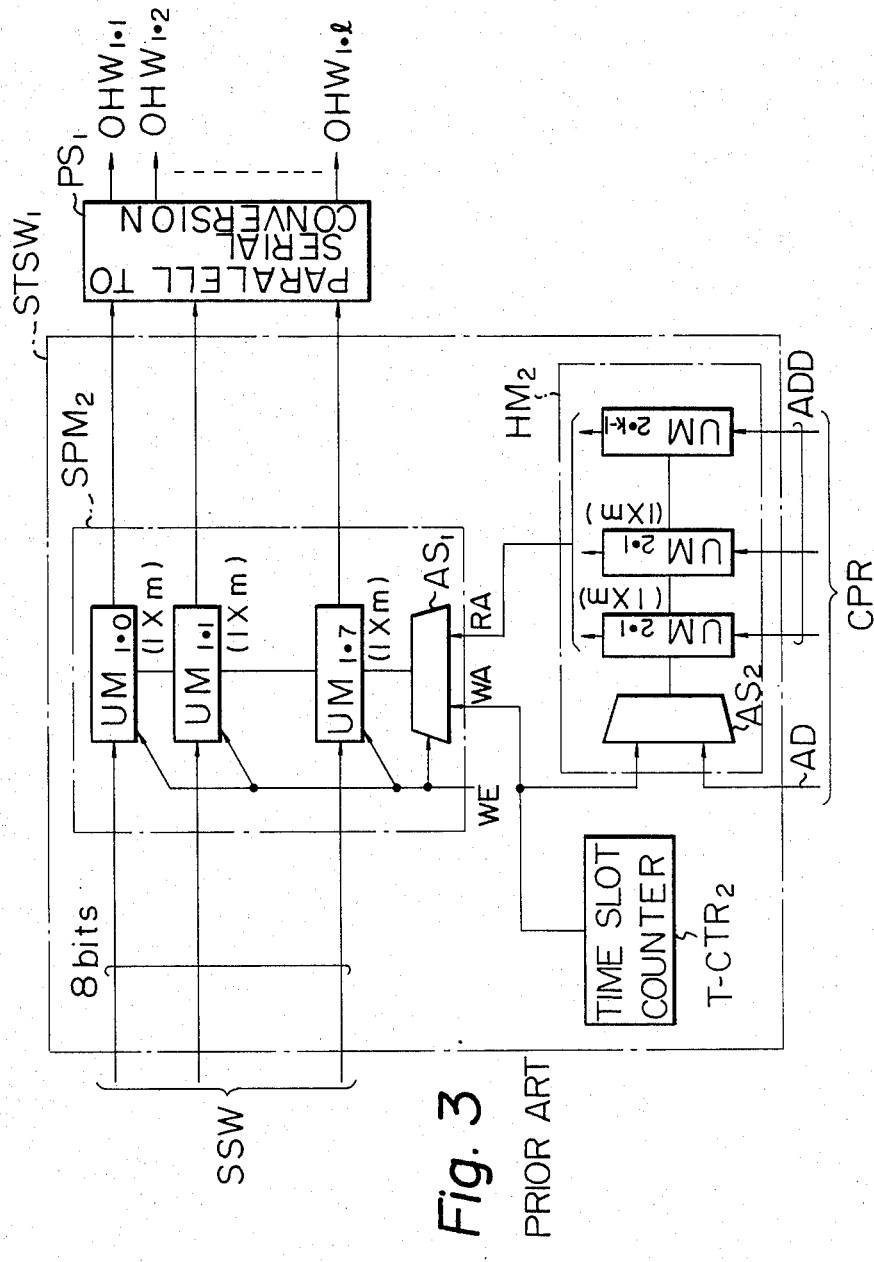
FIG. 3 is a block diagram of a prior art secondary time switch.

Similarly, a secondary time switch such as $STSW_1$ comprises a secondary speech path memory $SPM_2$ and a hold memory $HM_2$. In the TST configuration of FIG. 1, the secondary time switches $STSW_1$ through $STSW_n$ operate in the same manner as the primary time switches $PTSW_1$ through $PTSW_n$. That is, a speech signal is written from the space switch SSW into the secondary speech path memory $SPM_2$ at every time slot upon receipt of an address generated by the time slot counter, which is not shown in FIG. 1 but is shown in FIG. 3, and the written signal is read out upon receipt of an address read out of the hold memory $HM_2$, thereby performing the conversion of a time slot containing a speech signal.

Thus, the primary time switches $PTSW_1$ through $PTSW_n$ perform random write operations and sequential read operations while the secondary time switches $STSW_1$ through $STSW_n$ perform sequential write operations and random read operations.

The space switch SSW comprises a gate portion G including gate switches for connecting a primary speech path memory $SPM_1$ of a primary time switch such as $PTSW_1$ to a secondary speech path memory $SPM_2$ of a secondary time switch such as $STSW_1$. The space switch SSW further comprises speech path hold memories $HM_{3\text{-}1}$ through $HM_{3\text{-}n}$ for controlling the gate switches of the gate portion G. That is, in a particular time slot of the primary speech path memory $SPM_1$, the hold memories $HM_{3\text{-}1}$ through $HM_{3\text{-}n}$ generate signals, each of which indicate a gate switch to be turned on. When the indicated gate switch is turned on, a speech signal in the time slot of the speech path memory $SPM_1$ of a primary time switch such as $PTSW_1$ is transmitted via the turned-on gate switch to the secondary speech path memory $SPM_2$ of a secondary time switch such as $STSW_1$.

A primary time switch such as $PTSW_1$ is now explained in more detail with reference to FIG. 2. In FIG. 2, $T\text{-}CTR_1$ designates a time slot counter. If it is assumed that the multiplicity (the number of time slots in a frame) of each of the input highways $IHW_{1\text{-}1}$ through $IHW_{1\text{-}l}$ is m/l, then the multiplicity of each of the parallel highways $IHW_{1\text{-}p}$ is m. For example m=1024.

Eight (8) parallel bits per each time slot, transported over the eight parallel highways $IHW_{p\text{-}1}$, are transmitted 1 bit per one time slot to the primary speech path memory $SPM_1$.

The primary speech path memory $SPM_1$ comprises eight unit memories $UM_{1\text{-}0}$ through $UM_{1\text{-}7}$ of 1×m bits. The time slot counter $T\text{-}CTR_1$, which is constructed with an m-ary counter generates address information, which is increased by 1 at every time slot. In this case, the address information is comprised of at least k bits, where $k = \log_2 m = \log_2 1024 = 10$. On the other hand, the hold memory $HM_1$ also comprises k unit memories $UM_{2\text{-}0}$, ---, $UM_{2\text{-}(k-1)}$ of 1×m bits for generating m different pieces of address information.

During a write cycle for writing parallel 8-bit data into a time slot of the primary speech path memory $SPM_1$, a write enable signal WE, which is generated by a call processor CPR, is "1". In this case, an address selector $AS_1$ selects the output of the hold memory $HM_1$ while an address selector, $AS_2$ selects the output of the time slot counter $T\text{-}CTR_1$.

In the above-mentioned write cycle, the time slot counter $T\text{-}CTR_1$ generates address information corresponding to the abovementioned time slot and transmits it via the address selector $AS_2$ to the unit memories $UM_{2\text{-}0}$ through $UM_{2\text{-}(k-1)}$. As a result, each of the unit memories $UM_{2\text{-}0}$ through $UM_{2\text{-}(k-1)}$ generates address information as a write address WA and transmits it to the primary speech path memory $SPM_1$. That is, the write address WA is supplied via the address selector $AS_1$ to each of the unit memories $UM_{1\text{-}0}$ through $UM_{1\text{-}7}$ so that the parallel 8 bit data on the parallel highways $IHW_{p\text{-}1}$ is written into an area of the unit memories $UM_{1\text{-}0}$ through $UM_{1\text{-}7}$ indicated by the write address WA.

During a read cycle for reading parallel 8-bit data out of the primary speech path memory $SPM_1$, the write enable signal WE is "0". In this case, the address selector $AS_1$ selects the output of the time slot counter $T\text{-}CTR_1$. Therefore, the time slot counter $T\text{-}CTR_1$ generates address information as a read address RA corresponding to the above parallel 8-bit data and transmits it via the address selector $AS_1$ to the unit memories $UM_{1\text{-}0}$ through $UM_{1\text{-}7}$ so that the parallel 8-bit data is read from the unit memories $UM_{1\text{-}0}$ through $UM_{1\text{-}7}$, indicated by the read address RA, into the space switch SSW.

Thus, in the primary time switch $PTSW_1$, a speech signal from the serial-to-parallel conversion circuit $SP_1$ is randomly written into the unit memories $UM_{1\text{-}0}$ through $UM_{1\text{-}7}$ of the primary speech path memory $SPM_1$ indicated by the write address WA from the hold memory $HM_1$ while the written speech signal is sequentially read out of the unit memories $UM_{1\text{-}0}$ through $UM_{1\text{-}7}$ of the primary speech path memory $SPM_1$ indicated by the read address RA from the time slot counter $T\text{-}CTR_1$.

When a new speech path is provided, the address selector $AS_2$ selects address information AD from the call processor CPR, which, in this case, generates write address information ADD. As a result, the write address information ADD is written into the unit memories $UM_{2\text{-}0}$ through $UM_{2\text{-}(k-1)}$ indicated by the address information AD.

A secondary time switch such as $STSW_1$ is now explained with reference to FIG. 3. The configuration of the secondary time switch $STSW_1$ of FIG. 3 is identical to the configuration of the primary time switch $PTSW_1$ of FIG. 2 except that the location of the two inputs of the address selector $AS_1$ is different. That is, in FIG. 3, the address selector $AS_1$ selects the output of a time slot counter $T\text{-}CTR_2$ as a write address WA during write cycle and selects the output of the hold memory $HM_2$ as a read address RA during a read cycle. Therefore, the primary time switch $PTSW_1$ performs random write operations and sequential read operations and the secondary time switch STSW$_1$ performs sequential write operations and random read operations.

The speech path hold memories HM$_{3\cdot 1}$ through HM$_{3\cdot n}$ of the space switch SSW have the same configuration as the hold memories HM$_1$ and HM$_2$ of the primary time switch PTSW$_1$ and the secondary time switch STSW$_2$. The speech path hold memories HM$_{3\cdot 1}$ through HM$_{3\cdot n}$ are now explained with reference to FIG. 4. The hold memories HM$_{3\cdot 1}$ through HM$_{3\cdot n}$ are provided either for the respective highways HW$_1$ through HW$_n$ or the respective highways HW$_1'$ through HW$_n'$. The operation of a hold memory such as HM$_{3\cdot 1}$ is as follows. In a time slot, unit memories UM$_{3\cdot 0}$ through UM$_{3\cdot (k-1)}$ of the hold memory HM$_{3\cdot 1}$ generate address information indicated by a time slot counter T-CTR$_{3\cdot 1}$, which is constructed with an m-ary counter. The address information is transmitted to the gate portion G so as to indicate the turning on of a gate switch for connecting the highway HW$_1$ to one of the highways HW$_1'$ through HW$_n'$. As a result, in the above time slot, a speech signal is transmitted from the highway HW$_1$ via the turned-on gate switch of the gate portion G to a selected highway, such as HW$_1'$.

Note that the output of the time slot counter T-CTR$_{3\cdot 1}$ is used only within the hold memory HM$_{3\cdot 1}$. In addition, the number k' of unit memories such as UM$_{3\cdot 0}$ through UM$_{3\cdot (k'-1)}$ of 1×m bits per each hold memory is at least log$_2$n, where n is the number of highways HW$_1$ through HW$_n$, i.e., the number of primary time switches. Further, an address selector AS$_3$ selects the output of a time slot counter such as T-CTR$_{3\cdot 1}$ during a read cycle while it selects the output, i.e., address information AD, of the call processor CPR during a write cycle.

As is mentioned above, in the digital time-division switching system of FIG. 1, a large number of memory unit elements are used in the time switches and the space switch. In the prior art, the memory unit elements are constructed by combining general-purpose memory circuits and general-purpose logic circuits. Due to this combination, various kinds of memory circuits and logic circuits must be designed for respective memory unit elements, thereby complicating the design and manufacture of a digital time-division switching system and increasing the cost thereof.

As is mentioned above with reference to FIGS. 2, 3, and 4, the speech path memories SPM$_1$ and SPM$_2$ and the hold memories HM$_1$, HM$_2$, and HM$_{3\cdot 1}$ through HM$_{3\cdot n}$ are constructed commonly with unit memories of 1×m bits and an address selector. However, the selecting operation of each address selector and the required capacity of each memory unit comprised of unit memories are different for each of the above-mentioned memories.

In the present invention, a memory circuit is provided for incorporating mode switch circuits for controlling the selecting operation of an address selector and other functions from the exterior. Accordingly, a memory circuit can be adapted for various kinds of memories, such as SPM$_1$, SPM$_2$, HM$_1$, HM$_2$, and HM$_{1\cdot 1}$ through HM$_{1\cdot n}$. The difference in the required capacity between the memories can be compensated for by providing a memory circuit having a maximum capacity. The provision of such a memory circuit may result in redundancy, but the redundancy can be reduced by selecting the configuration of the digital time-division switching system.

Figure 5:
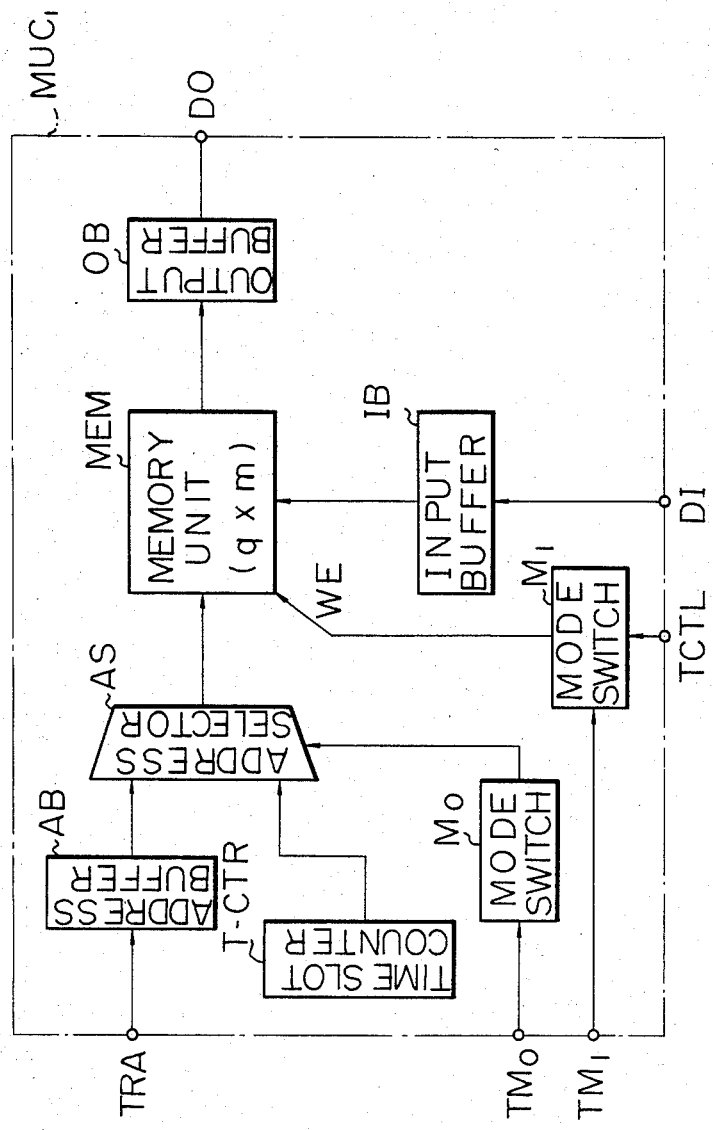
FIG. 5 is a block diagram of a first embodiment of the memory portion, according to the present invention, which is used in the time switches and the hold memories.

In FIG. 5, which is a first embodiment of the present invention, AB designates an address buffer for receiving an address from a terminal TRA, T-CTR designates a time slot counter, i.e., an m-ary counter, AS designates an address selector for selecting one of the outputs of the address buffer AB and the time slot counter, T-CTR, MEM designates a memory unit of q words and m bits, IB designates an input data buffer connected to a terminal DI, OB designates an output data buffer connected to a terminal DO, M$_0$ designates an address selection mode switch circuit connected to a terminal TM$_0$ and to the address selector AS, and M$_1$ designates a write mode switch circuit connected to terminals TM$_1$, TCTL and the memory unit MEM. Note that although each of the terminals TRA, DI$_1$ and DO is illustrated in FIG. 5 by a single terminal, each of the terminals is actually a plurality of terminals constructed for a plurality of parallel data.

Since the memory unit MEM must have a maximum capacity for each memory, q must be larger than log$_2$ m and log$_2$ n, and, furthermore, any unit memories of each speech path memory or hold memory can be constructed with the memory unit MEM.

A data signal is transmitted from the terminal DI via the input data buffer IB to the memory unit MEM, and an address signal is transmitted from the address selector AS to the memory unit MEM. During a write cycle having a time slot in which the write enable signal WE is "1", the transmitted data signal is written into the memory unit MEM indicated by the address signal transmitted from the address selector AS.

The address selector AS can receive two kinds of address signals, i.e., an internal address signal from the time slot counter T-CTR for performing a count-up operation in sychronization with the time slots and an external address signal from the address buffer AB. The selecting operation mode of the address selector AS is controlled by the address selection mode switch circuit M$_0$.

The address selection mode switch circuit M$_0$ is now explained. If the data "0" is applied to the terminal TM$_0$, the circuit M$_0$ transmits a first control signal to the address selector AS. As a result, the address selector AS selects an external address signal, i.e., the output of the address buffer AB during a write cycle, and selects an internal address signal, i.e., the output of the time slot counter T-CTR during a read cycle. However, if the data "1" is applied to the terminal TM$_0$, the circuit M$_0$ transmits a second control signal to the address selector AS. As a result, the address selector AS selects an internal address signal, i.e., the output of the time slot counter T-CTR during a write cycle, and selects an external address, signal, i.e., the output of the address buffer AB duirng a read cycle. That is, since the address selection mode switch circuit M$_0$ also receives a write-/read cycle control signal (not shown) from a control circuit, for example, from the call processor CPR of FIG. 1, the circuit M$_0$ transmits the read/write cycle control signal as the first control signal to the address selector AS when the data "0" is applied to the terminal TM$_0$ and transmits the inverted signal of the read/write cycle control signal as the second control signal to the address selector AS when the data "1" is applied to the terminal TM$_0$.

Note that the address selector AS can be constructed with two kinds of analog switches controlled by the output of the address selection mode switch circuit M$_0$.

In this case, the two kinds of analog switches operate in an opposite manner.

The write mode switch circuit $M_1$ is now explained. If the data "0" is applied to the terminal $TM_1$, the circuit $M_1$ generates the write enable signal WE (="1") during a write cycle regardless of the data applied to the terminal TCTL. However, if the data "1" is applied to the terminal $TM_1$, the circuit $M_1$ generates the write enable signal WE (="1") only if the data "1" is applied to the terminal $M_1$ during a write cycle. Note that the write mode switch circuit $M_1$ also receives a write/read cycle control signal (not shown).

The above-mentioned mode switch circuits $M_0$ and $M_1$ can be constructed with simple logic configurations.

In FIG. 5, if the data "0" is applied to both of the terminals $TM_0$ and $TM_1$, a data signal from the input data buffer IB is written into an area of the memory unit MEM indicated by an external address signal from the address buffer AB. In addition, the written data is read out of an area of the memory unit MEM indicated by an internal address signal from the time slot counter T-CTR and is transmitted via the output data buffer OB to the terminal DO. That is, a random write operation and a sequential read operation are performed in the memory unit MEM.

In FIG. 5, if the data "1" is applied to the terminal $TM_0$ and the data "0" is applied to the terminal $TM_1$, the output of the address selection mode switch circuit $M_0$ is inverted. Therefore, a write operation is performed upon receipt of an internal address signal from the time slot counter T-CTR and a read operation is performed upon receipt of an external address signal from the address buffer AB. Thus, a sequential write operation and a random read operation are performed.

In FIG. 5, if the data "1" is applied to the terminal $TM_1$, the circuit $M_1$ generates the write enable signal WE (="1") only if the data "1" is applied to the terminal TCTL. Therefore, in this case, if the data "0" is applied to the terminal $TM_0$, data from the input data buffer IB is written into an area of the memory unit MEM indicated by an external address signal from the address buffer AB. However, if the data "1" is applied to the terminal $TM_0$, data from the input data buffer IB is written into an area of the memory unit MEM indicated by an internal address signal from the time slot counter T-CTR.

Figure 6:
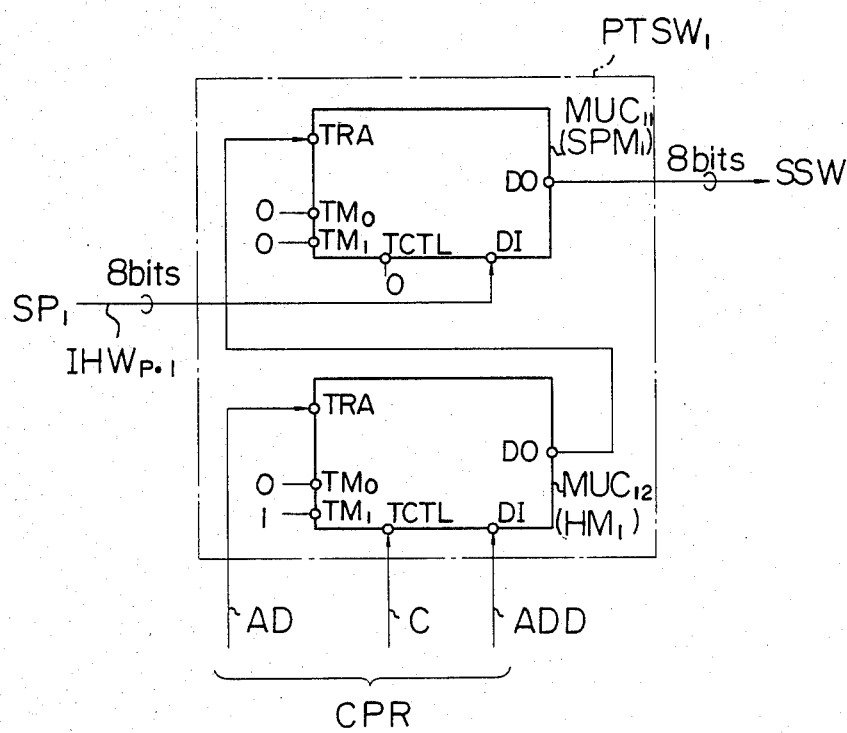
FIG. 6 is a block diagram of a primary time switch utilizing the switch of FIG. 4.

The primary time switch $PTSW_1$, as is illustrated in FIG. 2, is constructed from the circuit $MUC_1$ of FIG. 5. The primary time switch $DTSW_1$ is explained with reference to FIG. 6. In FIG. 6, two memory circuits $MUC_{11}$ and $MUC_{12}$ of the same type as the memory circuit $MUC_1$ of FIG. 5 are provided. That is, the memory circuit $MUC_{11}$ is used as the primary speech path memory $SPM_1$, and the memory circuit $MUC_{12}$ is used as the hold memory $HM_1$ including the time slot counter $T\text{-}CTR_1$ therein.

In the memory circuit $MUC_{11}$, the terminal DI receives the parallel 8-bit signal on the highways $IHW_{p-1}$, and the terminal DO is connected to the space switch SSW. In addition, the data "0" is applied to both of the terminals $TM_0$ and $TM_1$ so that the memory unit MEM (not shown) of the memory circuit $MUC_{11}$ performs a random write operation and a sequential read operation. In this case, although the data "0" is applied to the terminal TCTL, the data "1" may also be applied thereto. The terminal TRA for external addresses is connected to the terminal DO of the memory circuit $MUC_{12}$.

In the memory circuit $MUC_{12}$, the terminals TRA, TCTL, and DI are connected to the call processor CPR. That is, the terminal TRA receives address information AD and the terminal DI receives write address information ADD. In addition, the data "0" is applied to the terminal $TM_0$, and the data "1" is applied to the terminal $TM_1$ so that the memory unit MEM (not shown) of the circuit $MUC_{12}$ performs a sequential read operation upon the receipt of an internal address signal from the time slot counter T-CTR included in the memory circuit $MUC_{12}$. In addition, the memory circuit $MUC_{12}$ performs a write operation by using the address information AD at the terminal TRA and the write address information ADD at the terminal DI when the control signal at the terminal TCTL is "1". Thus, the call processor CPR sets a speech path at the primary time switch $PTSW_1$.

A speech signal transported over the highways $IHW_{p-1}$ is written into an area of the memory unit MEM of the memory circuit $MUC_{11}$ indicated by an address signal transmitted from the terminal DO of the memory circuit $MUC_{12}$ to the terminal TRA of the memory circuit $MUC_{11}$ during a write cycle. A written signal is read out of an area of the memory unit MEM of the memory circuit $MUC_{11}$ indicated by the output of the time slot counter T-CTR of the memory circuit $MUC_{11}$ into the terminal DO thereof during a read cycle. Thus, the primary time switch $PTSW_1$ for performing a random write operation and a sequential read operation is constructed.

Figure 7:
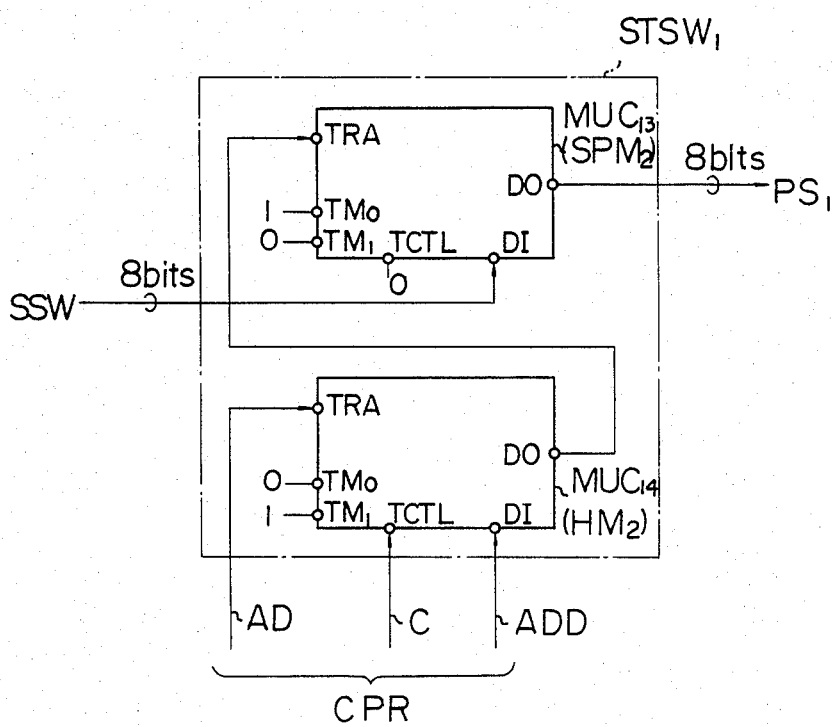
FIG. 7 is a block diagram of a secondary time switch utilizing the switch of FIG. 4.

The secondary time switch $STSW_1$, as is illustrated in FIG. 3, is also constructed from the circuit $MUC_1$ of FIG. 5. The secondary time switch $STSW_1$ is now explained with reference to FIG. 7. In FIG. 7, two memory circuits $MUC_{13}$ and $MUC_{14}$ of the same type as the memory circuit $MUC_1$ of FIG. 5 are provided. The memory circuit $MUC_{13}$ is used as the secondary speech path memory $SPM_2$, and the memory circuit $MUC_{14}$ is used as the hold memory $HM_2$ including the time slot counter $T\text{-}CTR_2$ therein. The memory circuits $MUC_{13}$ and $MUC_{14}$ correspond to the memory circuits $MUC_{11}$ and $MUC_{12}$, respectively, of FIG. 6 except that the data "1" is applied to the terminal $TM_0$ of the memory circuit $MUC_{13}$ so that a sequential write operation and a random read operation are performed in the memory unit MEM of the memory circuit $MUC_{13}$.

A speech signal, having 8 parallel bits, from the space switch SSW, is written into an area of the memory unit MEM of the memory circuit $MUC_{13}$ indicated by the output of the time slot counter T-CTR of the memory circuit $MUC_{13}$ during a write cycle. The written signal is read out of an area of the memory unit MEM of the memory circuit $MUC_{12}$ indicated by an address signal transmitted from the terminal DO of the memory circuit $MUC_{14}$ to the terminal TRA of the memory circuit $MUC_{13}$ to the terminal DO thereof during a read cycle. Thus, the secondary time switch $STSW_1$ for performing a sequential write operation and a random read operation is constructed.

Figure 4:
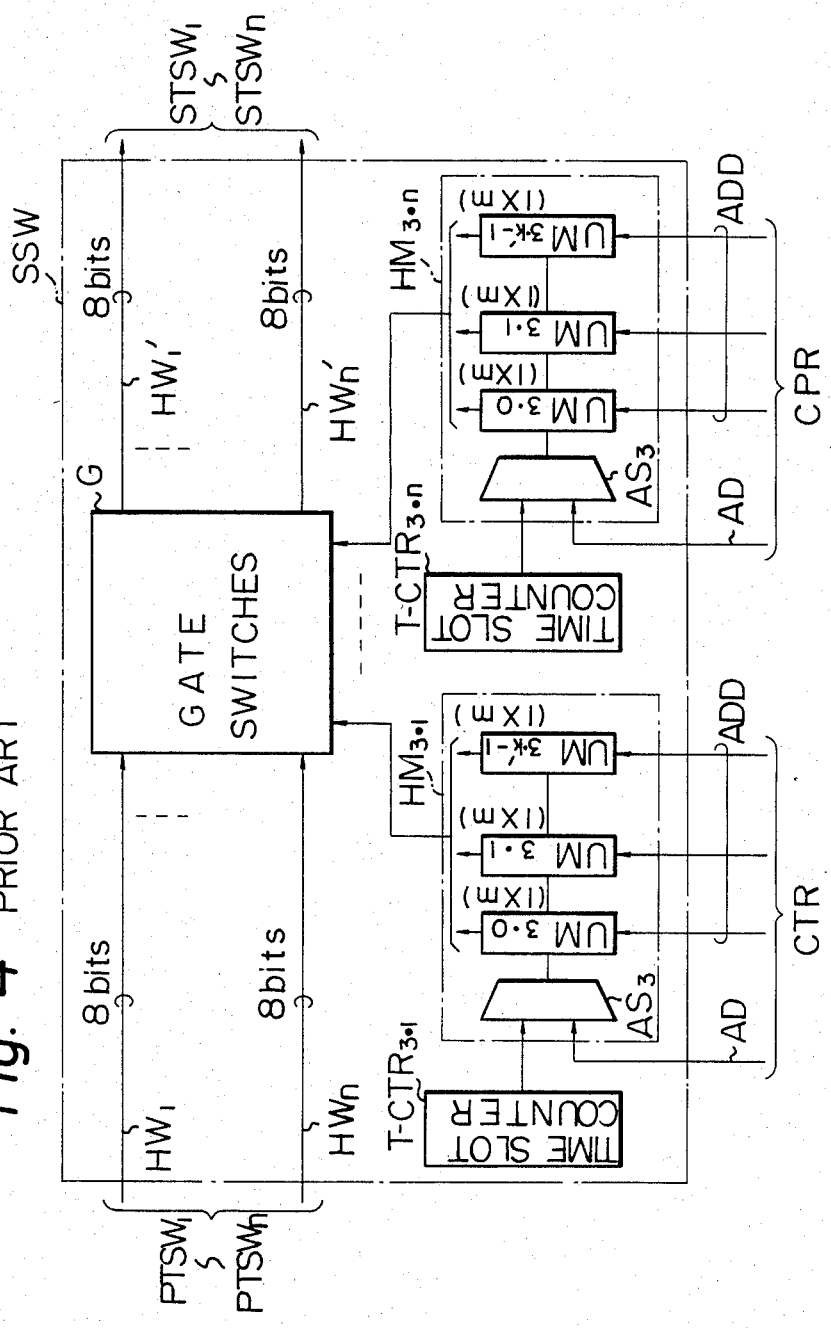
FIG. 4 is a block diagram of a prior art space switch.
Figure 8:
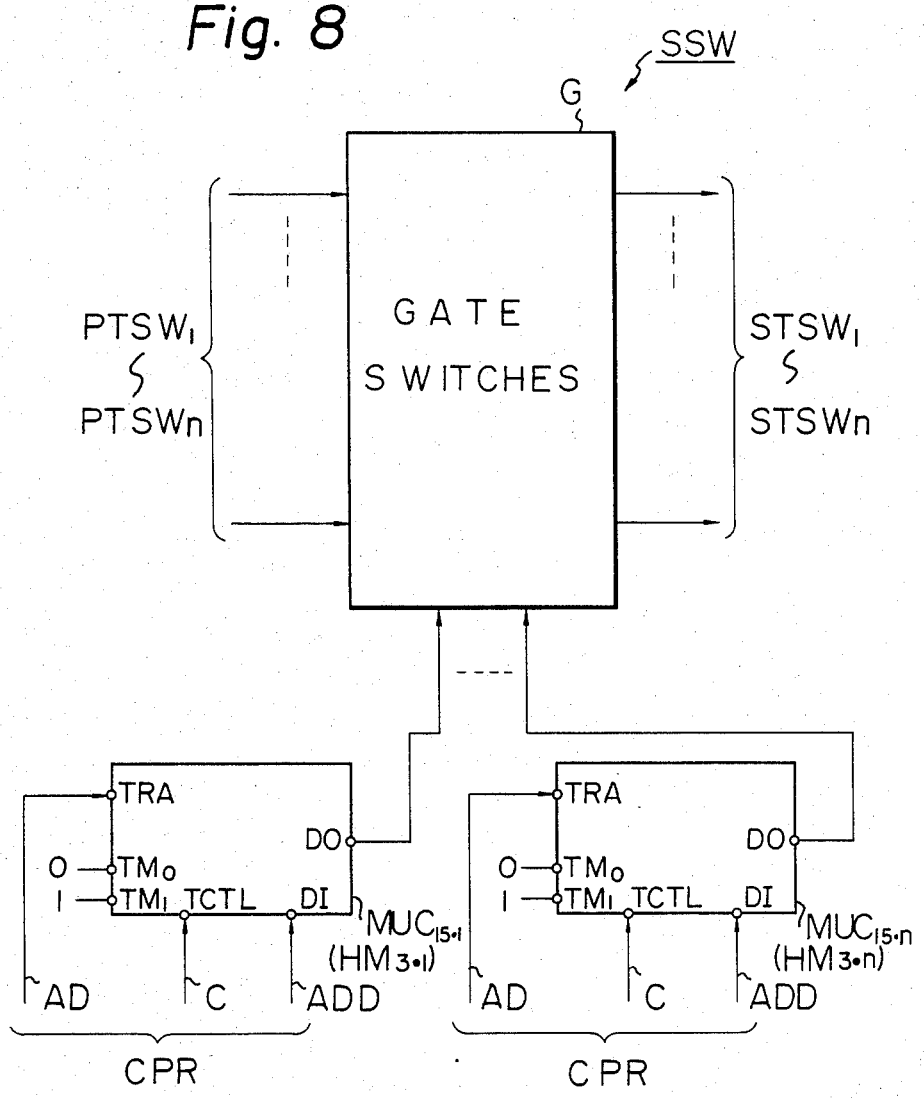
FIG. 8 is a block diagram of a space switch utilizing the switch of FIG. 4.

The hold memories $HM_{3-1}$ through $HM_{3-n}$ of the space switch SSW, as is illustrated in FIG. 4, are also constructed from the circuit $MUC_1$ of FIG. 5. The hold memories $HM_{3-1}$ through $HM_{3-n}$ are explained with reference to FIG. 8. In FIG. 8, circuits $MUC_{15-1}$ through $MUC_{15-n}$ of the same type as the memory circuit $MUC_1$ of FIG. 5 are provided. The memory circuits $MUC_{15-1}$ through $MUC_{15-n}$ are used as the hold memories $HM_{3-1}$ through $HM_{3-n}$, respectively, in FIG.

4. In addition the memory circuits $MUC_{15\text{-}1}$ through $MUC_{15\text{-}n}$ incorporate the time slot counters $T\text{-}CTR_{3\text{-}1}$ through $T\text{-}CTR_{3\text{-}n}$, respectively.

Note that the connections of the memory circuits $MUC_{15\text{-}1}$ through $MUC_{15\text{-}n}$ are similar to those of the memory circuits $MUC_{12}$ and $MUC_{14}$ of FIGS. 6 and 7, respectively. That is, in each of the memory circuits $MUC_{15\text{-}1}$ through $MUC_{15\text{-}n}$, "0" and "1" are applied to the terminals $TM_0$ and $TM_1$, respectively, and the terminals TRA, TCTL, and DI are connected to the call processor CPR. Therefore, the memory unit MEM (not shown) of a circuit such as $MUC_{15\text{-}1}$ performs a write operation upon receipt of the address information AD at the terminal TRA and the write address information ADD at the terminal DI when the control signal at the terminal TCTL is "1". In addition, the memory circuit $MUC_{15\text{-}1}$ performs a sequential read operation upon receipt of an internal address signal from the time slot counter T-CTR, included in the memory circuit $MUC_{15\text{-}1}$, so that read data is transmitted to the terminal DO to indicate a gate switch to be turned on. Thus, the call processor CPR sets a speech path for conversion between highways.

Thus, according to the present invention, the speech path memories $SPM_1$ and $SPM_2$ and the hold memories $HM_1$, $HM_2$, and $HM_{3\text{-}1}$ through $HM_{3\text{-}n}$ can be constructed from the same kind of memory circuit. In addition, since this kind of memory circuit can easily be constructed from a one-chip LSI semiconductor device, it is possible to reduce the size of the entire digital time-division switching system, thereby increasing the speed of the system. And further, since a digital time-division switching system can be constructed from a plurality of one-chip LSIs of the same configuration, it is easy to design and manufacture the system.

Figure 9:
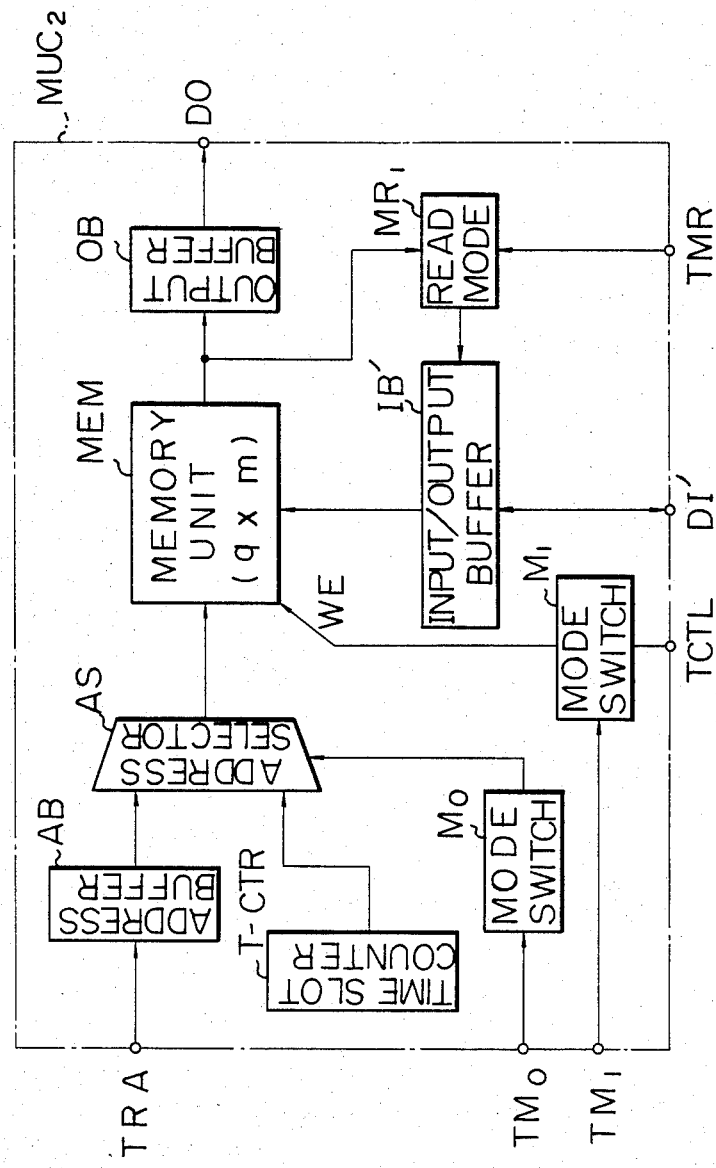
FIGS. 9, 10, and 11 are block diagrams of second, third, and fourth embodiments, respectively, of the memory according to the present invention, which portion is used in the time switches and the hold memories.

In FIG. 9, which is a second embodiment of the present invention, a maintenance read mode switch circuit $MR_1$ connected to a terminal TMR is added to the circuit $MUC_1$ of FIG. 5. In addition, the input data buffer IB of FIG. 5 connected to the terminal DI is replaced by an input/output data buffer IB' connected to a terminal DI'. The maintenance read mode switch circuit $MR_1$ does not operate when the data "0" is applied to the terminal TMR. However, when the data "1" is applied to the terminal TMR, read data is transmitted from the memory unit MEM via the read mode switch circuit $MR_1$ to the input/output data buffer IB' during a read cycle. As a result, since the input/output data buffer IB' is bidirectional, the read data is obtained at the terminal DI', thereby checking the data stored in the memory unit MEM. Thus, in the maintenance of the memory circuit $MUC_2$ of FIG. 9, the contents of the memory unit MEM can be detected without the incorporation of an additional terminal.

Figure 10:
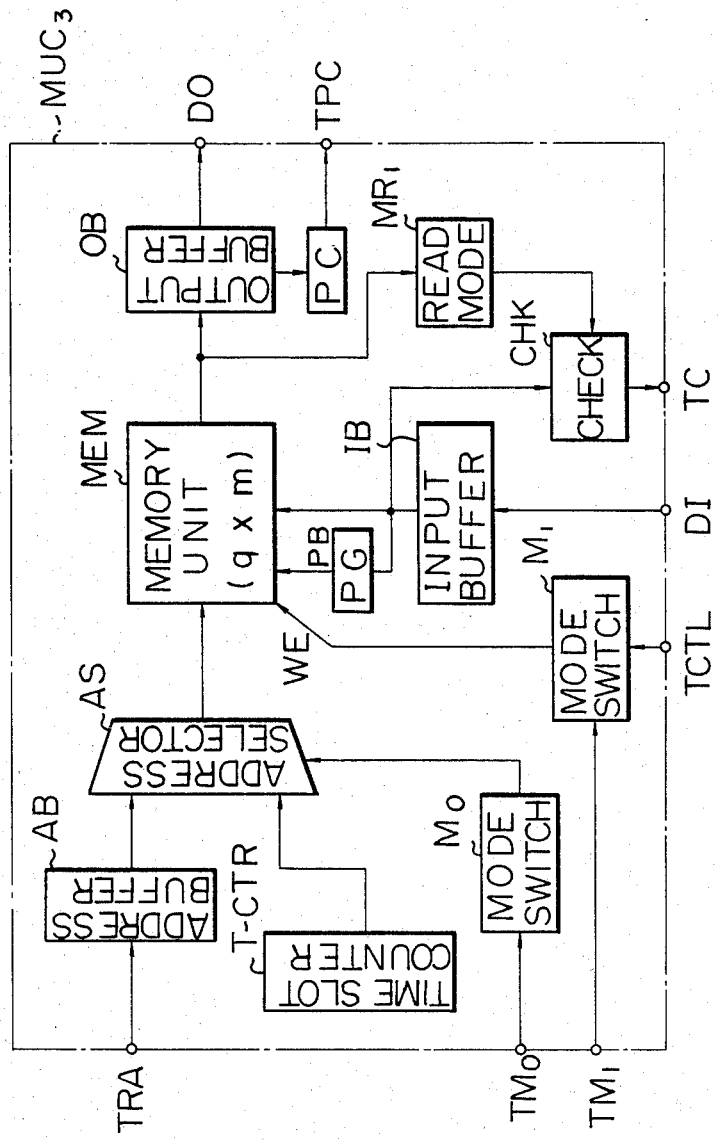

In FIG. 10, which is a third embodiment of the present invention, a parity bit generator PG, a parity bit check circuit PC connected to a terminal TPC, a maintenance read mode circuit $MR_2$, and a data check circuit CHK connected to a terminal TC are added to the circuit $MUC_1$ of FIG. 5. Note that the maintenance read mode circuit $MR_2$ has the same function as the maintenance read mode switch circuit $MR_1$ of FIG. 9. However, the maintenance read mode circuit $MR_2$ has no terminal indicated from the outside, and, therefore, the maintenance read mode circuit $MR_2$ is always in a maintenance read mode.

In FIG. 10, data is transmitted from the terminal DI via the input data buffer IB to the memory unit MEM and, simultaneously, to the parity bit generator PG, which generates a parity check bit PB for the input data. The parity check bit PB is also transmitted to the memory unit MEM and is written into the same area of the memory unit MEM as the input data.

During a read cycle, the above data, as well as the parity check bit PB, is read out to the output data buffer OB, which transmits the data, without the parity check bit PB, to the terminal DO. Simultaneously, the data, as well as the parity check bit PB, is transmitted from the output data buffer OB to the data check circuit CHK, which performs a check operation. The result of checking is transmitted from the parity bit check circuit PC to the terminal TPC.

In order to check whether input data is correctly written into an indicated area of the memory unit MEM, the maintenance read mode circuit $MR_2$ and the data check circuit CHK operate. In this case, suitable data is applied to the terminals $TM_0$, $TM_1$, and TCTL. During a write cycle, test data from the terminal DI is written into an area of the memory unit MEM indicated by an address transmitted from the terminal TRA. Similarly, during the next read cycle, the same address is transmitted from the terminal TRA to read out the test data of the memory unit MEM. As a result, the read test data is transmitted via the maintenance read mode circuit $MR_2$ to the data check circuit CHK, in which the read test data is compared with the test data stored in the input data buffer IB. If the two pieces of data are the same, the data check circuit CHK generates a coincidence signal which is transmitted to the terminal TC, thereby indicating that the test data is correctly written into an indicated area of the memory unit MEM. However, if the two pieces of data are different from each other, the data check circuit CHK generates no coincidence signal, thereby indicating that the write operation was incorrectly performed. Thus, the operation of the memory unit MEM is checked.

In FIG. 10, note that an output from the terminal TPC or TC is necessary when a parity check operation is performed or when the memory unit MEM is tested. But if such a parity check operation and a test operation are unnecessary, an output from the terminals TPC and TC is unnecessary.

The primary and secondary time switches and the hold memories of FIGS. 2, 3, and 4 can also be constructed from the memory circuit of FIG. 9 or FIG. 10.

Figure 11:
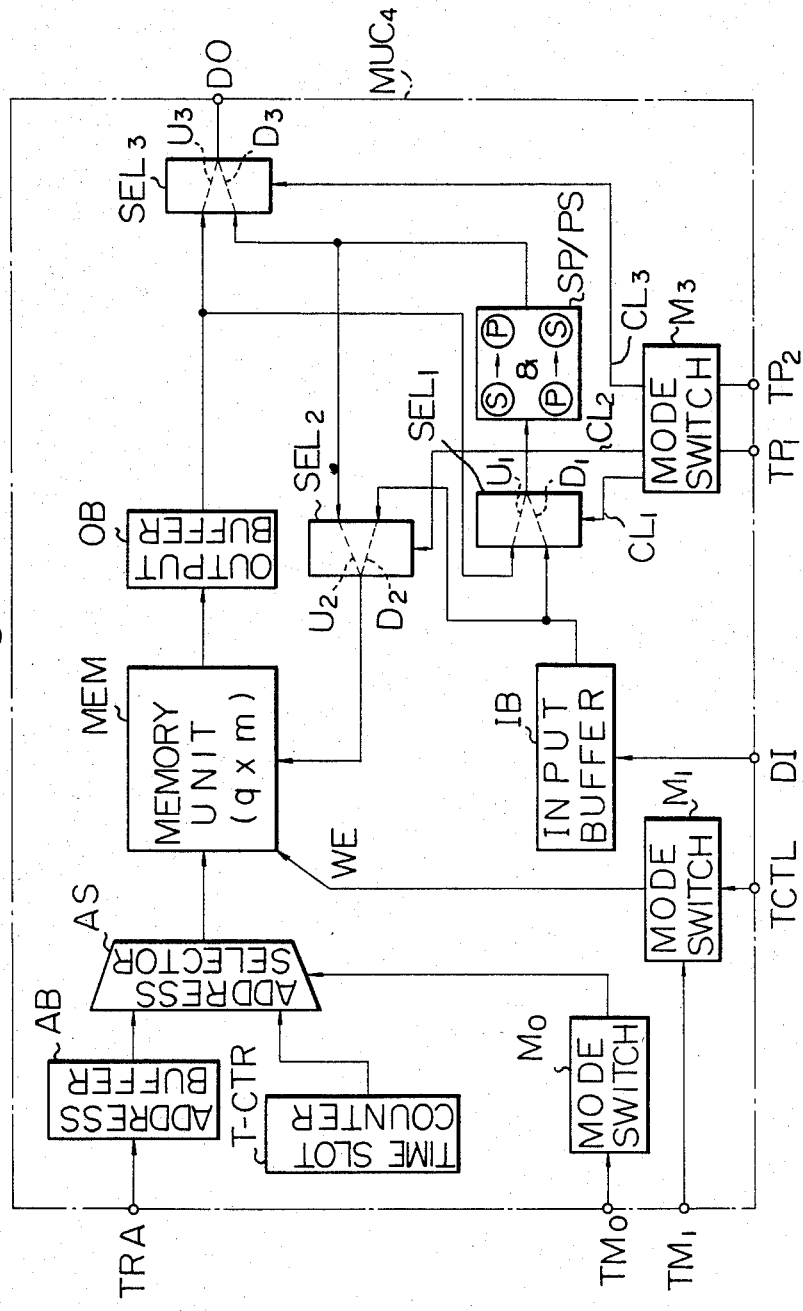

In FIG. 11, which is a fourth embodiment of the present invention, a common circuit SP/PS for serial-to-parallel conversion and parallel-to-serial conversion, route selectors $SEL_1$, $SEL_2$, and $SEL_3$, and a route selection mode switch circuit $M_3$ are connected to terminals $TP_1$ and $TP_2$ are added to the circuit $MUC_1$ of FIG. 5. That is, the serial-to-parallel conversion circuit $SP_1$ of FIG. 2 and the parallel-to-serial conversion circuit $PS_1$ of FIG. 3 are constructed as a common circuit SP/PS.

Note that the configuration of such a circuit for serial-to-parallel conversion and parallel-to-serial conversion is well known.

The route selection mode switch $M_3$ and the route selectors $SEL_1$, $SEL_2$, and $SEL_3$ operate in accordance with the following table:

| $TP_1$ | $TP_2$ | $CL_1$ | $CL_2$ | $CL_3$ |
|---|---|---|---|---|
| "0" | "0" | "0" | "1" | "1" |
| "1" | "0" | "1" | "0" | "0" |

-continued

| TP$_1$ | TP$_2$ | CL$_1$ | CL$_2$ | CL$_3$ |
|---|---|---|---|---|
| "0" | "1" | "1" | "0" | "1" |
| "1" | "1" | "0" | "0" | "1" |

In the above table, CL$_1$, CL$_2$, and CL$_3$ designate control signals for the route selectors SEL$_1$, SEL$_2$, and SEL$_3$, respectively. For example, if the control signal CL$_1$ is "1", the route selector SEL$_1$ selects the up route U$_1$ while if the control signal CL$_1$ is "0", the route selector SEL$_1$ selects the down route D$_1$.

When the data "0" is applied to both of the terminals TP$_1$ and TP$_2$, the control signals CL$_1$, CL$_2$, and CL$_3$ of the route selection mode switch circuit M$_3$ are "0", "1", and "1", respectively. Therefore, the route selector SEL$_1$ selects the down route D$_1$, and the route selectors SEL$_2$ and SEL$_3$ select the up routes U$_2$ and U$_3$, respectively. As a result, input data having 8 serial bits per each time slot from the terminal DI is transmitted via the input data buffer IB and the down route D$_1$ of the selector SEL$_1$ to the circuit SP/PS, in which a serial-to-parallel conversion operation is performed. This converted data is then transmitted via the up route U$_2$ of the route selector SEL$_2$ to the memory unit MEM. On the other hand, parallel data read out of the memory unit MEM is transmitted via the output data buffer OB and the up route U$_3$ of the route selector SEL$_3$ to the terminal DO. Thus, the memory circuit MUC$_4$ of FIG. 11 in the case where the data "0" is applied to both of the terminals TP$_1$ and TP$_2$ can be used as the speech path memory SPM$_1$ including the serial-to-parallel conversion circuit SP$_1$ of FIG. 2.

When the data "1" is applied to the terminal TP$_1$ and the data "0" is applied to the terminal TP$_2$, the control signals CL$_1$, CL$_2$, and CL$_3$ of the route selection mode switch circuit M$_3$ are "0", "1", and "1", respectively, as indicated above. Therefore, the route selector SEL$_1$ selects the up route U$_1$, and the route selectors SEL$_2$ and SEL$_3$ select the down routes D$_2$ and D$_3$, respectively. As a result, input data having 8 parallel bits per each time slot from the terminal DI is transmitted via the input data buffer IB and the down route D$_2$ of the selector SEL$_2$ to the memory unit MEM. On the other hand, parallel data read out of the memory unit MEM is transmitted via the output data buffer OB and the up route U$_1$ of the route selector SEL$_1$ to the circuit SP/PS, in which a parallel-to-serial conversion operation is performed. This converted data is then transmitted via the down route D$_3$ of the route selector SEL$_3$ to the terminal DO. Thus, the memory circuit MUC$_4$ of FIG. 11, in the case where the data "1" is applied to the terminal TP$_1$ and the data "0" is applied to the terminal TP$_2$, can be used as the speech path memory SPM$_2$ including the parallel-to-serial conversion circuit SP$_2$ of FIG. 3.

When the data "0" is applied to the terminal TP$_1$ and the data "1" is applied to the terminal TP$_2$, the control signals CL$_1$, CL$_2$, and CL$_3$ of the route selection mode switch circuit M$_3$ are "1", "0", and "1", respectively. Therefore, the route selectors SEL$_1$ and SEL$_3$ select the up routes D$_1$ and D$_3$, respectively, and the route selector SEL$_2$ selects the down route U$_2$. As a result, input data transmitted from the terminal DI cannot pass through the circuit SP/PS, and, accordingly, no serial-to-parallel conversion and no parallel-to-serial conversion is performed on the input data. That is, the input data is transmitted via the down route U$_2$ of the route selector SEL$_2$ to the memory unit MEM. On the other hand, data read from the memory unit MEM is transmitted via the output data buffer OB and the up route U$_3$ of the route selector SEL$_3$ to the terminal DO. In this case, the data is also transmitted via the up route U$_2$ to the circuit SP/PS. However, the signal converted by the circuit SP/PS is not transmitted to any elements.

Note that the case where the data "1" is applied to both of the terminals TP$_1$ and TP$_2$ corresponds to the case where the data "0" is applied to the terminal TP$_1$ and the data "1" is applied to the terminal TP$_2$. That is, no substantial serial-to-parallel or parallel-to-serial conversion is performed in either case. Thus, the memory circuit MUC$_4$ of FIG. 11, in the case where the data "0" or "1" is applied to the terminal TP$_1$ and the data "1" is applied to the terminal TP$_2$, can be used as the hold memories MH$_1$, MH$_2$, and MH$_{3-1}$ through MH$_{3-n}$ of FIGS. 2, 3, and 4.

The primary time switch PTSW$_1$ of FIG. 2, the secondary time switch STSW$_1$ of FIG. 3, and the space switch SSW of FIG. 4 are constructed from the memory circuit MUC$_4$ of FIG. 11, and are explained below with reference to FIGS. 12, 13, and 14, respectively.

Figure 12:
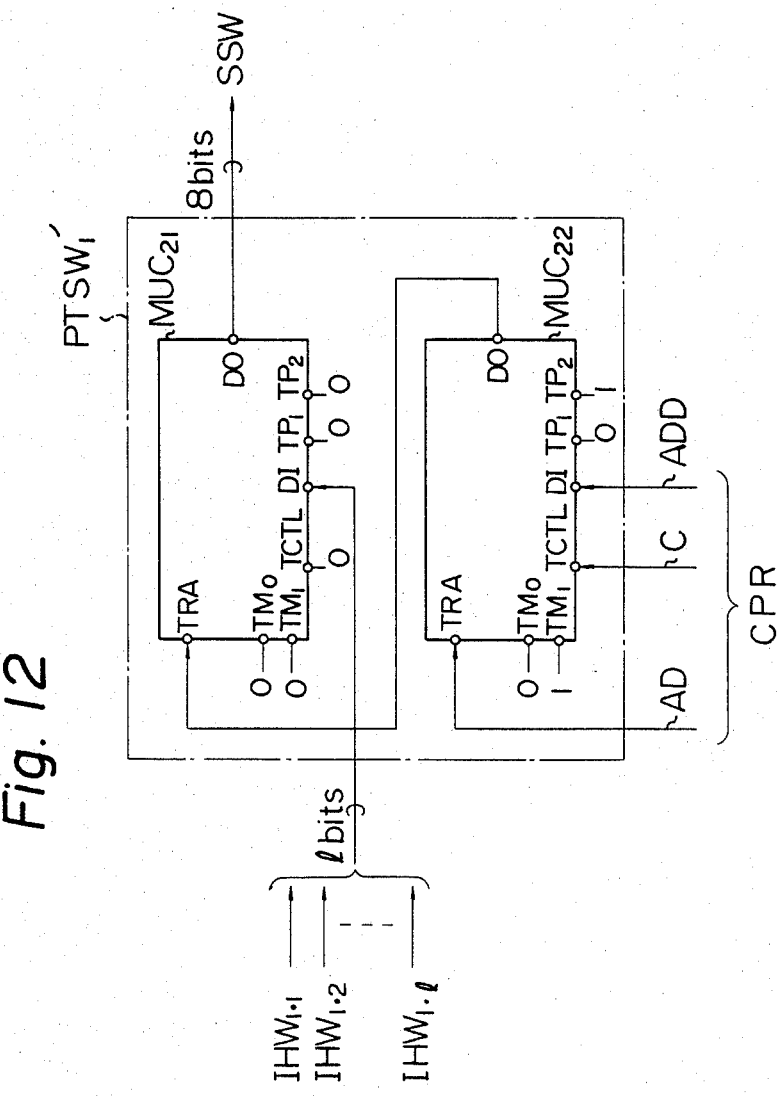
FIG. 12 is a block diagram of a primary time switch utilizing the switch of FIG. 11.

In FIG. 12, a primary time switch PTSW$_1$' includes the primary time switch PTSW$_1$ and the serial-to-parallel conversion circuit SP$_1$ of FIG. 2. Two memory circuits MUC$_{21}$ and MUC$_{22}$ have the same configuration as the memory circuit MUC$_4$ of FIG. 11. In the memory circuit MUC$_{21}$, since the data "0" is applied to both of the terminals TP$_1$ and TP$_2$, the memory circuit MUC$_{21}$ serves as the speech path memory SPM$_1$ as well as the serial-to-parallel conversion circuit SP$_1$ of FIG. 2. On the other hand, in the memory circuit MUC$_{22}$, since the data "0" is applied to the terminal TP$_1$ and the data "1" is applied to the terminal TP$_2$, the circuit SP/PS does not affect the operation of the circuit MUC$_{22}$, and, accordingly, the memory circuit MUC$_{22}$ is the same as the memory circuit MUC$_{12}$ of FIG. 6, that is, the memory circuit MUC$_{22}$ serves as the hold memory HM$_1$ as well as the time slot counter T-CTR$_1$ of FIG. 2.

Figure 13:
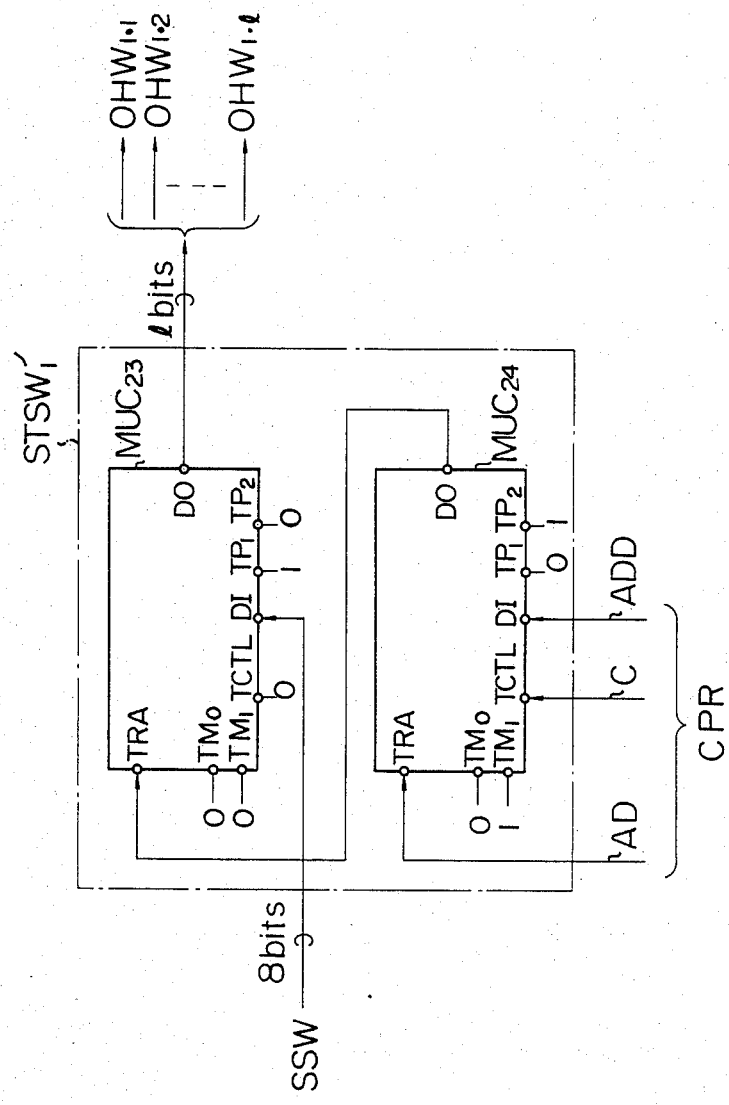
FIG. 13 is a block diagram of a secondary time switch utilizing the switch of FIG. 11.

In FIG. 13, a secondary time switch STSW$_1$' includes the secondary time switch PTSW$_1$ and the parallel-to-serial conversion circuit PS$_1$ of FIG. 3. Two memory circuits MUC$_{23}$ and MUC$_{24}$ have the same configuration as the memory circuit MUC$_4$ of FIG. 11. In the memory circuit MUC$_{23}$, since the data "1" is applied to the terminal TP$_1$ and the data "0" is applied to the terminal TP$_2$, the memory circuit MUC$_{23}$ serves as the speech path memory SPM$_2$ as well as the parallel-to-serial conversion circuit PS$_1$ of FIG. 3. On the other hand, in the memory circuit MUC$_{24}$, since the data "0" is applied to the terminal TP$_1$ and the data "1" is applied to the terminal TP$_2$, the circuit SP/PS does not affect the operation of the circuit MUC$_{24}$, and, accordingly, the memory circuit MUC$_{24}$ is the same as the memory circuit MUC$_{14}$ of FIG. 7, that is, the memory circuit MUC$_{24}$ serves as the hold memory HM$_2$ as well as the time slot counter T-CTR$_2$ of FIG. 3.

Figure 14:
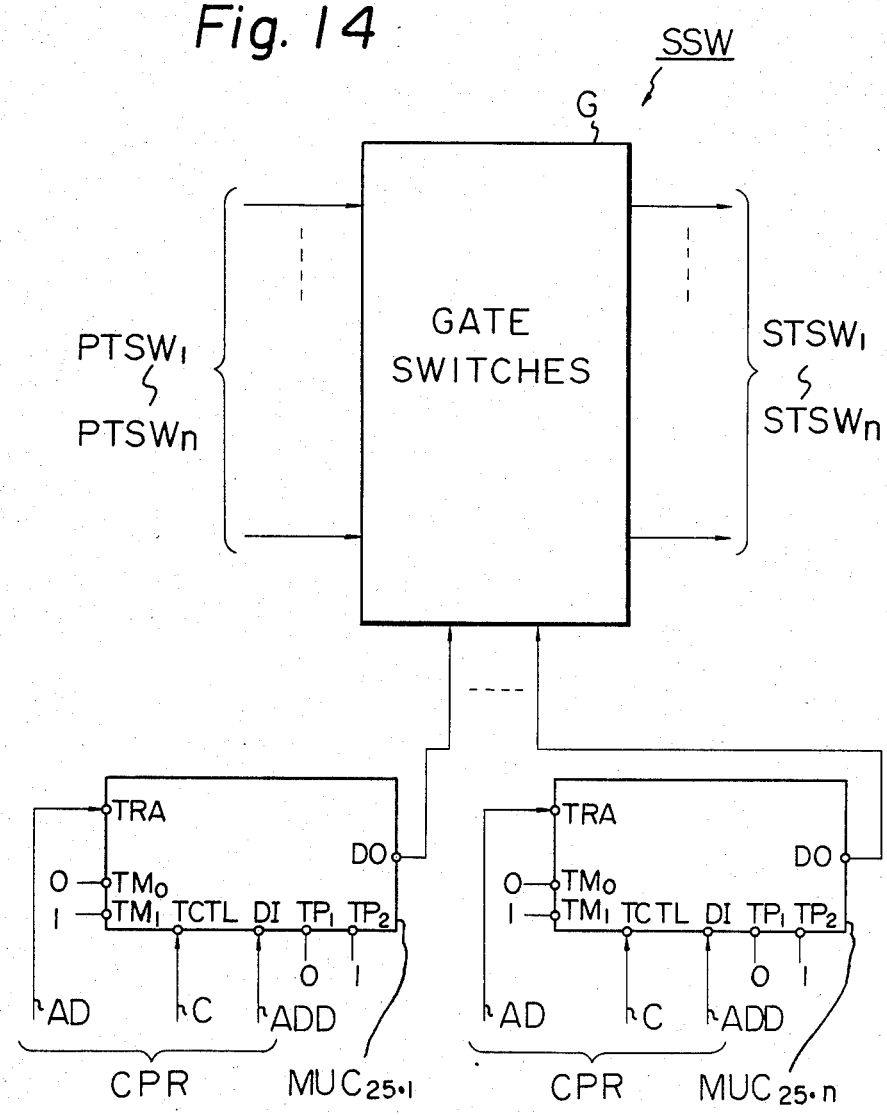
FIG. 14 is a block diagram to a space switch utilizing the switch of FIG. 11.

In FIG. 14, memory circuits MUC$_{25-1}$ through MUC$_{25-n}$ have the same configuration as the memory circuit MUC$_4$ of FIG. 11. In each of the memory circuits MUC$_{25-1}$ through MUC$_{25-n}$, since the data "0" is applied to the terminal TP$_1$ and the data "1" is applied to the terminal TP$_2$, the circuit SP/PS does not affect the operation of the circuits MUC$_{25-1}$ through MUC$_{25-n}$, of FIG. 14, and accordingly, the memory circuits MUC$_{25-1}$ through MUC$_{25-n}$ are the same as the memory circuits MUC$_{15-1}$ through MUC$_{15-n}$ of FIG. 8.

In FIGS. 5 through 14, a plurality of terminals TRA, a plurality of terminals DI, and a plurality of terminal DO are actually necessary for each memory circuit. However, only one of each of these terminals is illustrated for the sake of simplicity.

We claim:

1. A time-switch having read and write cycles and operatively connected to receive a control signal, for use in a primary time switch of a time-space-time network, the primary time switch having a primary speech path memory, a hold memory, operatively connected to the primary speech path memory, for generating a write address for random writing into the primary speech path memory, and a time slot counter, operatively connected to the primary speech path memory, for generating a read address for sequentially reading out of the primary speech path memory, said time switch circuit comprising:

a first memory circuit including the primary speech path memory and the time slot counter;

a second memory circuit operatively connected to said first memory circuit and including the hold memory;

said first and second memory circuits having first and second address signals and having input and output terminals, respectively, said input terminals receiving input data, each of said first and second memory circuits comprising:

a memory unit of q-words, q being an integer greater than or equal to one, and m-bits, m being an integer greater than or equal to one, for receiving and transmitting data;

an address selector, having a selection mode operatively connected to said memory unit and said first and second memory circuits, for selecting one of the first and second address signals and transmitting it to said memory unit;

an address buffer, operatively connected to said address selector, for receiving and providing the first address signal to said address selector;

an m-ary counter, operatively connected to said address selector, for receiving and providing the second address signal to said address selector;

address selection mode switching means, operatively connected to said address selector for controlling the selection mode of said address selector;

write mode switching means having a write enable signal, operatively connected to said memory unit, for controlling the mode of generation of the write enable signal transmitted to said memory unit;

an input data buffer, operatively connected to said memory unit, for transmitting the input data from the input terminal to said memory unit; and an output data buffer, operatively connected to said memory unit, for transmitting the input data from said memory unit to the output terminal;

said output terminal of said second memory circuit being connected to said input terminal of said first memory circuit, said address selection mode switching means of said first and second memory circuits being controlled so that said address selector of each of said first and second memory circuits selects the first address signal during the write cycle and selects the second address signal during the read cycle, said write mode switching means of said first memory circuit being controlled to generate the write enable signal during every write cycle, said write mode switching means of said second memory circuit being controlled to generate the write enable signal only upon receipt of the control signal during the write cycle.

2. A time-switch circuit having read and write cycles and operatively connected to receive a control signal, for use in a secondary time switch of a time-space-time network circuit, the secondary time switch including a secondary speech path memory, a time slot counter for generating a write address and sequentially writing and transmitting the write address to the secondary speech path memory, and a hold memory for generating a read address and random reading and transmitting the read address to the secondary speech path memory, said time switch circuit comprises:

a first memory circuit including the secondary speech path memory and the time slot counter;

a second memory circuit operatively connected to said first memory circuit and including the hold memory;

each of said first and second memory circuits receiving first and second address signals and having input and output terminals having input data and output data, respectively, comprising:

a memory unit having q-words, q being an integer greater than or equal to one, and m-bits, m being an integer greater than or equal to one, for receiving the first and second address signals and transmitting output data;

an address selector having a selection mode, operatively connected to said memory unit, for receiving and selecting one of the first and second address signals and transmitting the selected one of the first and second address signals to said memory unit;

an address buffer, operatively connected to said address selector, for receiving the first address signal and passing it therethrough;

an m-ary counter, operatively connected to said address selector, for generating the second address signal;

address selection mode switching means, operatively connected to said address selector, for controlling the selection mode of said address selector;

write mode switching means having a write enable signal, operatively connected to said memory unit, for controlling the mode of generation of the write enable signal transmitted to said memory unit;

an input data buffer, operatively connected to said memory unit, for transmitting the input data from said input terminal to said memory unit; and an output data buffer, operatively connected to said memory unit, for transmitting the output data from said memory unit to said output terminal;

said output terminal of said second memory circuit being connected to said output terminal of said first memory circuit, said address selection mode switching means of said first memory circuit being controlled so that said address selector of said first memory circuit selects the second address signal during a write cycle and selects the first address signal during a read cycle, said write mode switching means of said first memory circuit being controlled to generate the write enable signal during every write cycle, said address selection mode switching means of said second memory circuit being controlled so that said address selector of said second memory circuit selects the first address signal during the write cycle and selects the second address signal during the read cycle, said write mode switching means of said second memory circuit being controlled to generate the write enable signal only upon receipt of the control signal during the write cycle.

3. A time-switch circuit having write and read cycles and input and output terminals having input and output data, respectively, and operatively connected to receive a control signal, for use in a space switch of a time-space-time network, the space switch including a gate portion having gate switches, a plurality of hold memories, each hold memory generating a selection signal for indicating one of the gate switches, a plurality of time slot counters, each time slot counter generating a read address to the hold memories, and a plurality of memory circuits each including one of the hold memories and one of the time slot counters, each of said memory circuits comprising:
a memory unit of q-words, q being an integer greater than or equal to one, and m-bits, m being an integer greater than or equal to one, for writing in and reading out data;
an address buffer having an address terminal having first address signals, operatively connected to said memory unit, for receiving one of the first address signals of the address terminal and outputting the one of the first address signals to said memory unit;
an m-ary counter, operatively connected to said address buffer, for generating a second address signal;
an address selector having a selection mode, operatively connected to said address buffer, said m-ary counter and said memory unit, for selecting one of the first address signals and the second address signal and transmitting it to said memory unit;
address selection mode switching means operatively connected to said address selector, for controlling the selection mode of said address selector;
write mode switching means having a write enable signal, operatively connected to said memory unit, for controlling the mode of generation of the write enable signal transmitted to said memory unit;
an input data buffer, operatively connected to said memory unit, for transmitting the input data from the input terminals to said memory unit; and
an output data buffer, operatively connected to said memory unit, for transmitting the data read out of said memory unit to the output terminal;
said output terminals of each of said memory circuits being connected to one of said gate switches, said address selection mode switching means of said memory circuits being controlled so that said address selector of each of said memory circuits selects one of the first address signals during the write cycle and selects the second address signal during the read cycle, said write mode switching means of each of said memory circuits being controlled to generate the write enable signal only upon receipt of the control signal during the write cycle.

4. A time-switch circuit as set forth in claim 1, 2, or 3, wherein each of said memory circuits further comprises a maintenance read mode switching means having a terminal operatively connected to receive the control signal and operatively connected to said input data buffer and said memory unit, for transmitting the data read out of said memory unit to said input data buffer upon receipt of the control signal from said terminal, said input data buffer serving as an input/output data buffer.

5. A time-switch circuit as set forth in claim 1, 2, or 3, wherein each of said memory circuits further comprises:
a parity bit generator, operatively connected to said input data buffer and said memory unit, for generating a parity check bit in accordance with the output data of the input data buffer and transmitting it to said memory unit; and
a parity bit check circuit, operatively connected to said output data buffer, for performing a parity bit check operation upon receipt of the output data by said output data buffer.

6. A time-switch circuit as set forth in claim 1, 2, or 3, wherein each of said memory circuits further comprises:
a maintenance read mode circuit operatively connected to said memory unit and providing a read mode output data; and
a data check circuit, operatively connected to said input data and said maintenance read mode circuit, for comparing the read mode output data of said maintenance read mode circuit with the output of said input data buffer and generating a coincidence signal in dependence upon the result of the comparison.

7. A time-switch circuit as set forth in claim 1, wherein each of said first and second memory circuits further comprises:
a common circuit, operatively connected to said memory unit, for serial-to-parallel conversion and parallel-to-serial conversion;
route-selecting means, operatively connected to said common circuit, said input data buffer, said output data buffer, and said memory unit, for selecting the route which the input data is to follow; and
route-selection mode switching means, operatively connected to said route-selecting means, for controlling said route-selecting means;
said route-selection mode switching means in said first memory circuit controlling said route-selecting means so that said common circuit is connected in series to said input data buffer, said route-selection mode switching means of said second memory circuit controlling said route-selecting means so that said common circuit does not affect the operation of said memory circuit.

8. A time-switch circuit as set forth in claim 2, wherein each of said first and second memory circuits further comprises:
a common circuit for serial-to-parallel conversion and parallel-to-series conversion;
route-selecting means arranged, operatively connected to said common circuit, said input data buffer, said output data buffer and said memory unit, for selecting the route which the input data is to follow; and route-selection mode switching means, operatively connected to said route-selecting means, for controlling said route-selecting means;

said route-selection mode switching means in said first memory circuit controlling said route-selecting means so that said common circuit is connected in series to said output data buffer, said route-selection mode switching means of said second memory circuit controlling said route-selecting means so that said common circuit does not affect the operation of said memory circuit.

9. A time-switch circuit having read and write cycles and operatively connected to receive a control signal, for use in a primary time switch of a time-space-time network, said time switch circuit comprising:

a first memory circuit comprising:
  a primary speech path memory; and
  a time slot counter having a read address, operatively connected to said primary speech path memory, for generating the read address and sequentially reading out of the primary speech path memory;

a second memory circuit operatively connected to said first memory circuit, comprising:
  a hold memory having a write address, operatively connected to said speech path memory, for generating the write address and randomly writing into the primary speech path memory;

said first and second memory circuits having first and second address signals and input and output terminals, respectively, said input terminals receiving input data, and said output terminal of said second memory circuit being connected to said input terminal of said first memory circuit, each of said first and second memory circuits comprising:

a memory unit of q-words, q being an integer greater than or equal to one, and m-bits, m being an integer greater or equal to one, for receiving and transmitting data;

an address selector having a selection mode, operatively connected to said memory unit and said first and second memory circuits, for selecting one of the first and second address signals and transmitting it to said memory units;

an address buffer, operatively connected to said address selector, for receiving and providing the first address signal to said address selector;

an m-ary counter, m being an integer greater than or equal to one, operatively connected to said address selector for receiving and providing the second address signal to said address selector;

address selection mode switching means, operatively connected to said address selector, for controlling the selection mode of said address selector such that each of said first and second memory circuits selects the first address signal during the write cycle and selects the second address signal during the read cycle;

write mode switching means, operatively connected to said memory unit, for generating the write enable signal transmitted to said memory unit, said write mode switching means of said first memory circuit being controlled to generate the write enable signal during every write cycle and said write mode switching means of said second memory circuit being controlled to generate the write enable signal only upon receipt of the control signal during the write cycle;

an input data buffer, operatively connected to said memory unit for transmitting the input data from the input terminal to said memory unit; and an output data buffer, operatively connected to said memory unit, for transmitting the input data from said memory unit to the output terminal.

* * * * *

UNITED STATES PATENT AND TRADEMARK OFFICE
CERTIFICATE OF CORRECTION

PATENT NO. : 4,512,012  
DATED : APRIL 16, 1985  
INVENTOR(S) : TAKESHI SAMPEI ET AL.

It is certified that error appears in the above-identified patent and that said Letters Patent is hereby corrected as shown below:

FRONT PAGE [73] Assignee, before "Fujitsu" insert --Nippon Telegraph & Telephone Public Corporation, Tokyo;--.

Col. 1, line 66, "contrased" should be --contrasted--;
       line 67, "," should be --.--;
       line 68, delete "wherein.".

Col. 2, line 3, "is" should be --are--;
       line 3, "diagram" should be --diagrams--;
       line 22, after "memory" insert --portion--;
       line 23, delete "portion";
       line 29, "to" should be --of--;
       line 35, "$IHW_{n \cdot 1}$" (italicized) should be --$IHW_{n \cdot 1}$--.

Col. 3, line 2, "OHW" should be --OHW--.

Col. 4, line 11, "memcry" should be --memory--.

UNITED STATES PATENT AND TRADEMARK OFFICE
CERTIFICATE OF CORRECTION

PATENT NO. : 4,512,012
DATED : APRIL 16, 1985
INVENTOR(S) : TAKESHI SAMPEI ET AL.

It is certified that error appears in the above-identified patent and that said Letters Patent is hereby corrected as shown below:

Col. 6, line 6, delete ",".

Col. 7, line 5, "(="1)" should be --(="1")--.

Col. 13, line 2, "terminal" should be --terminals--.

Col. 16, line 63, "series" should be --serial--.

Signed and Sealed this

Nineteenth Day of November 1985

[SEAL]

Attest:

DONALD J. QUIGG

Attesting Officer

Commissioner of Patents and Trademarks